Aug. 15, 1961
W. LUCZEK ET AL
2,995,881
MACHINE CONTROL SYSTEMS
Filed June 3, 1957
14 Sheets-Sheet 1
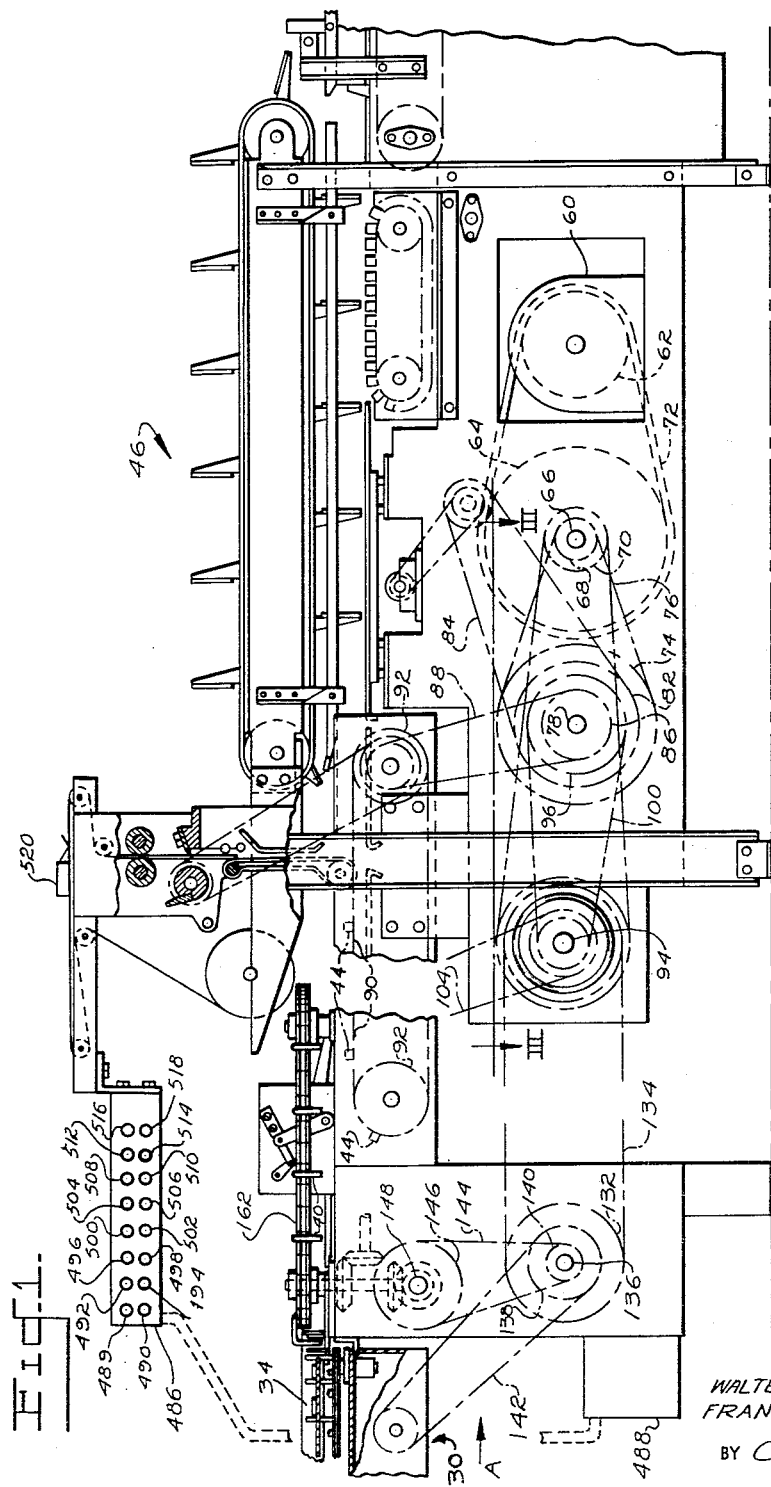
INVENTORS
WALTER LUCZEK &
FRANCIS CRESCENZO
BY Chapin & Neal
ATTORNEYS

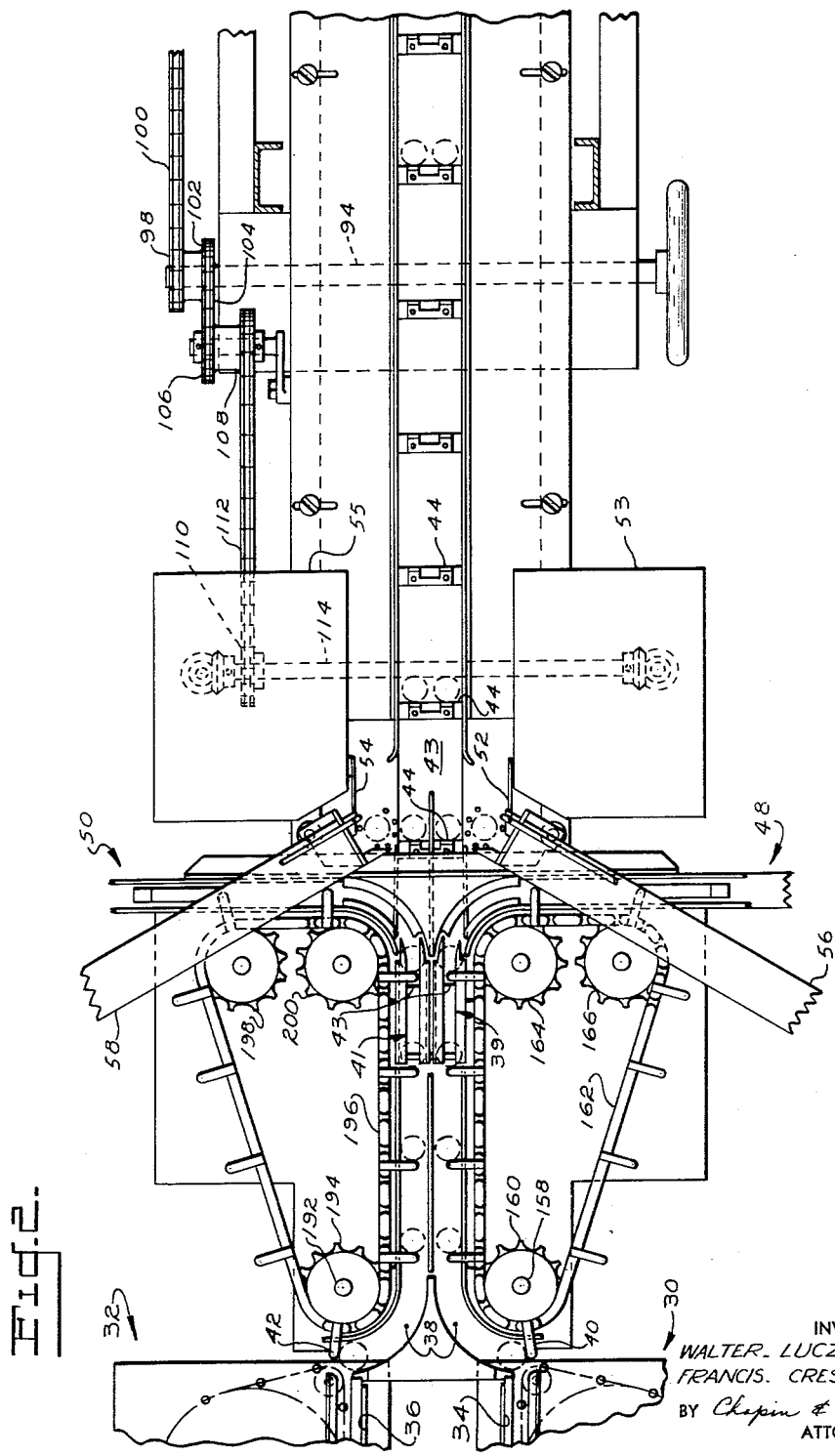

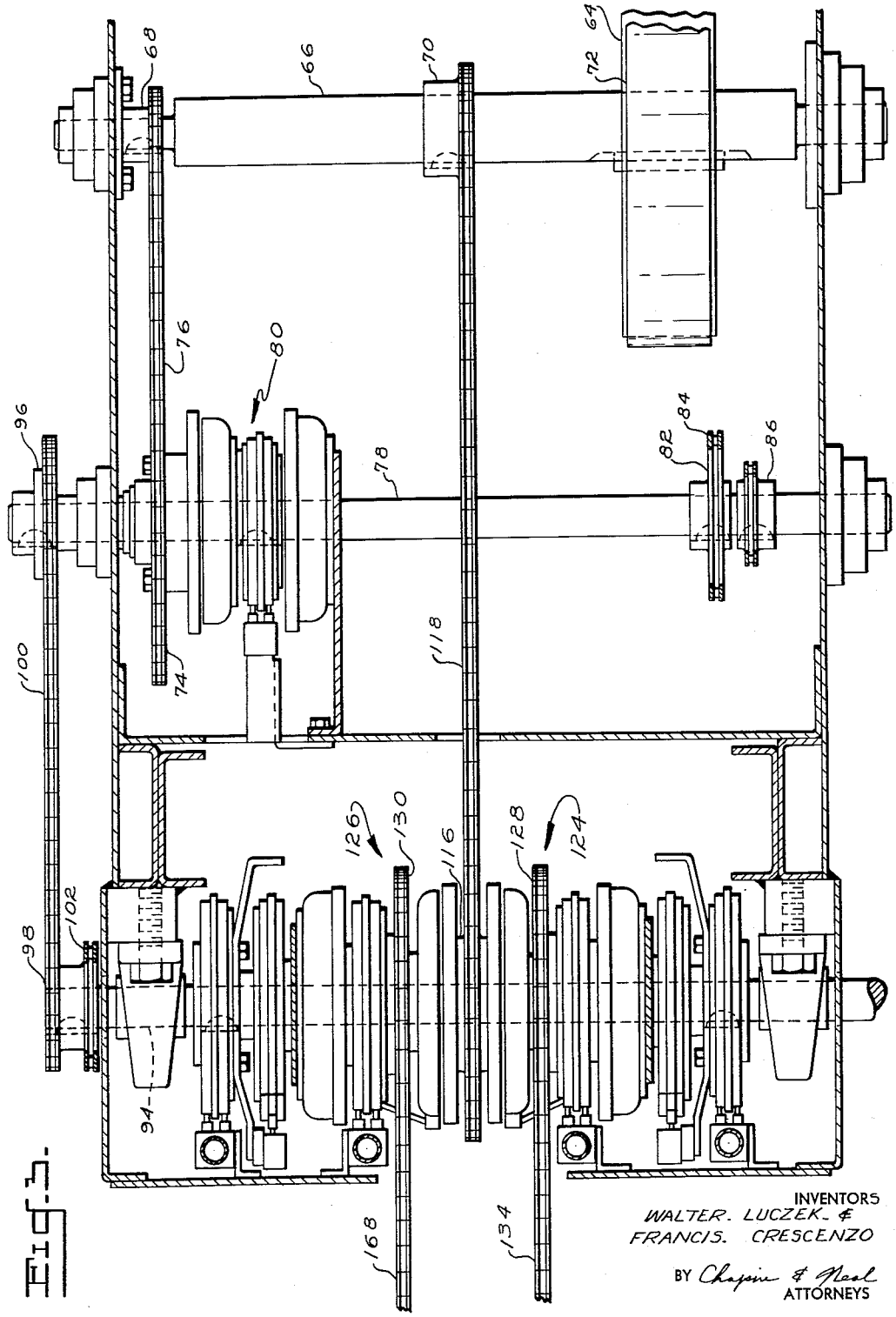

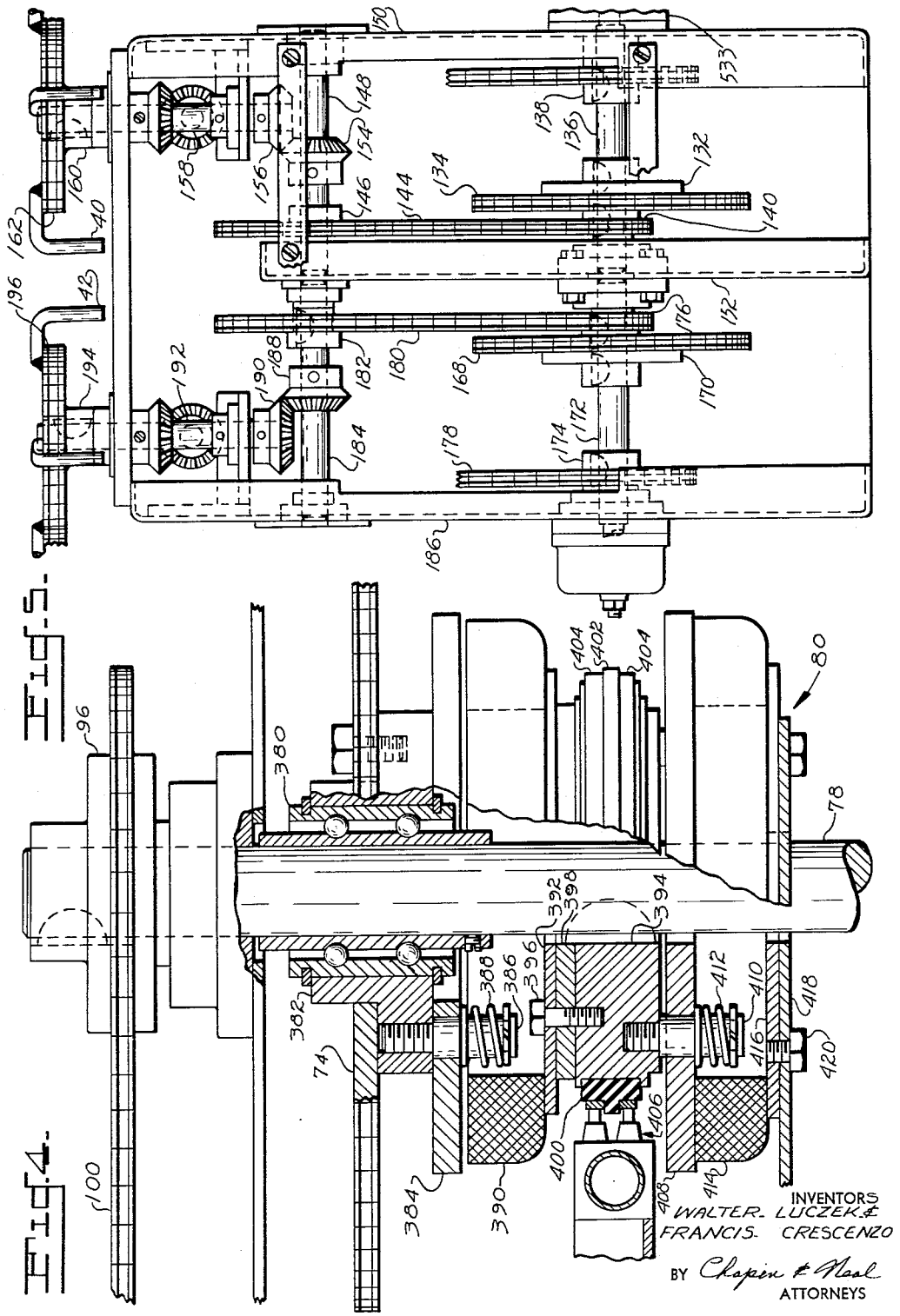

Aug. 15, 1961 W. LUCZEK ET AL 2,995,881
MACHINE CONTROL SYSTEMS
Filed June 3, 1957 14 Sheets-Sheet 5
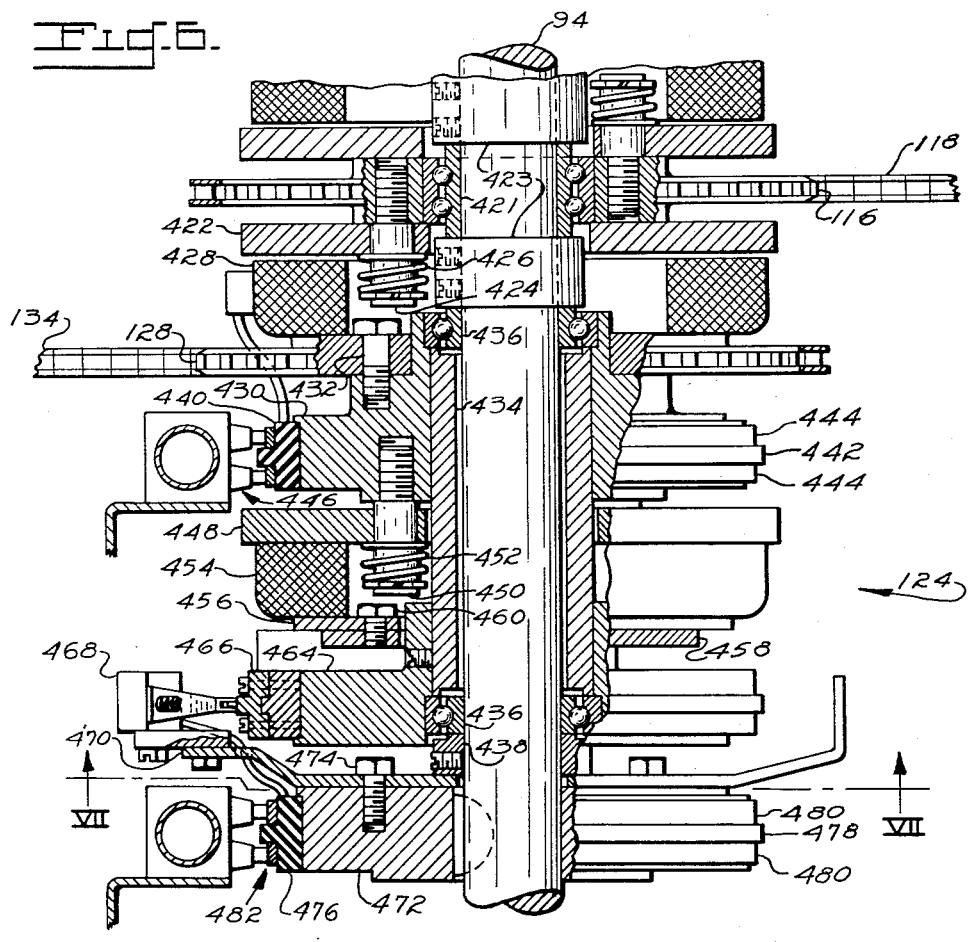
INVENTORS
WALTER LUCZEK &
FRANCIS CRESCENZO
BY Chapin & Neal
ATTORNEYS

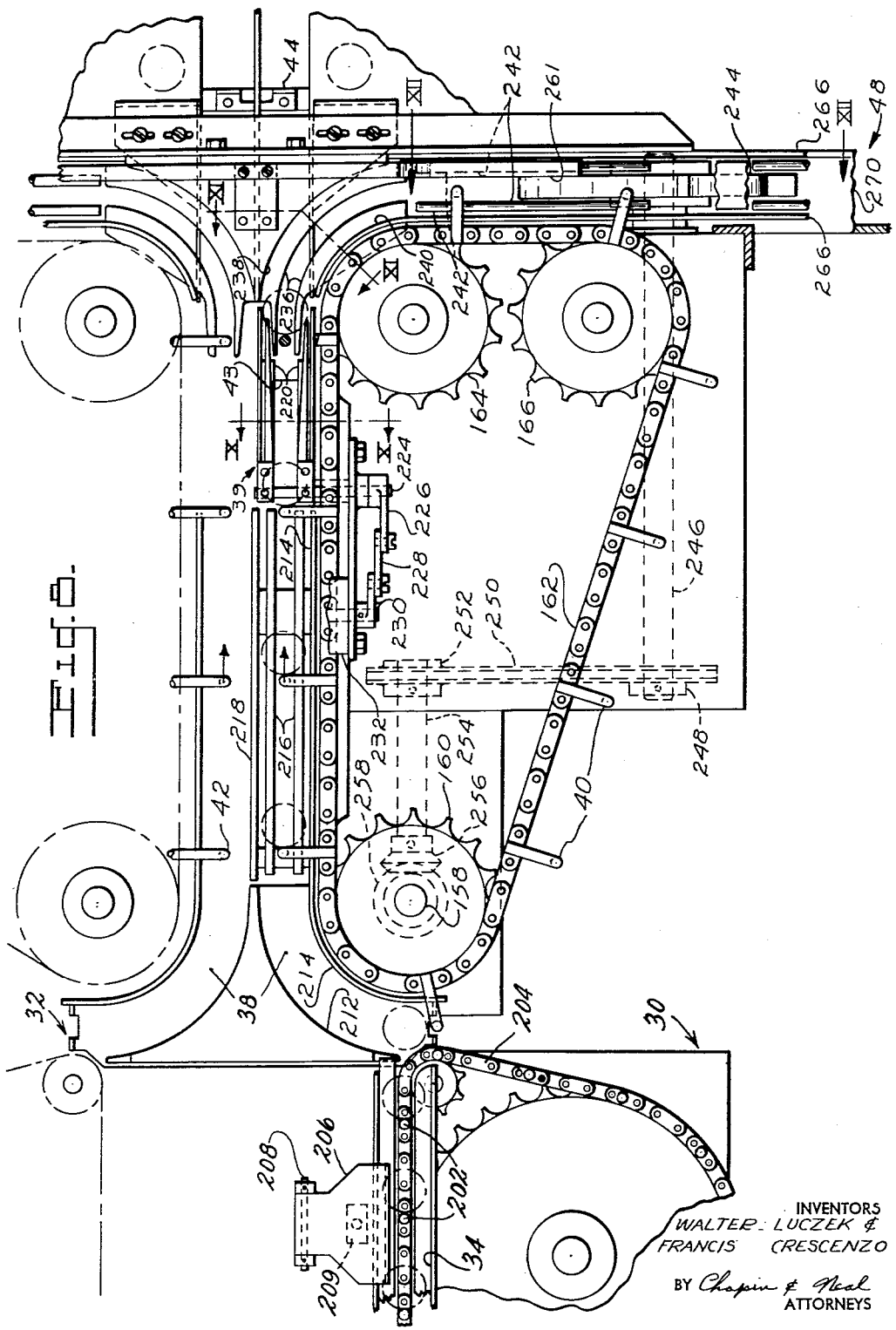

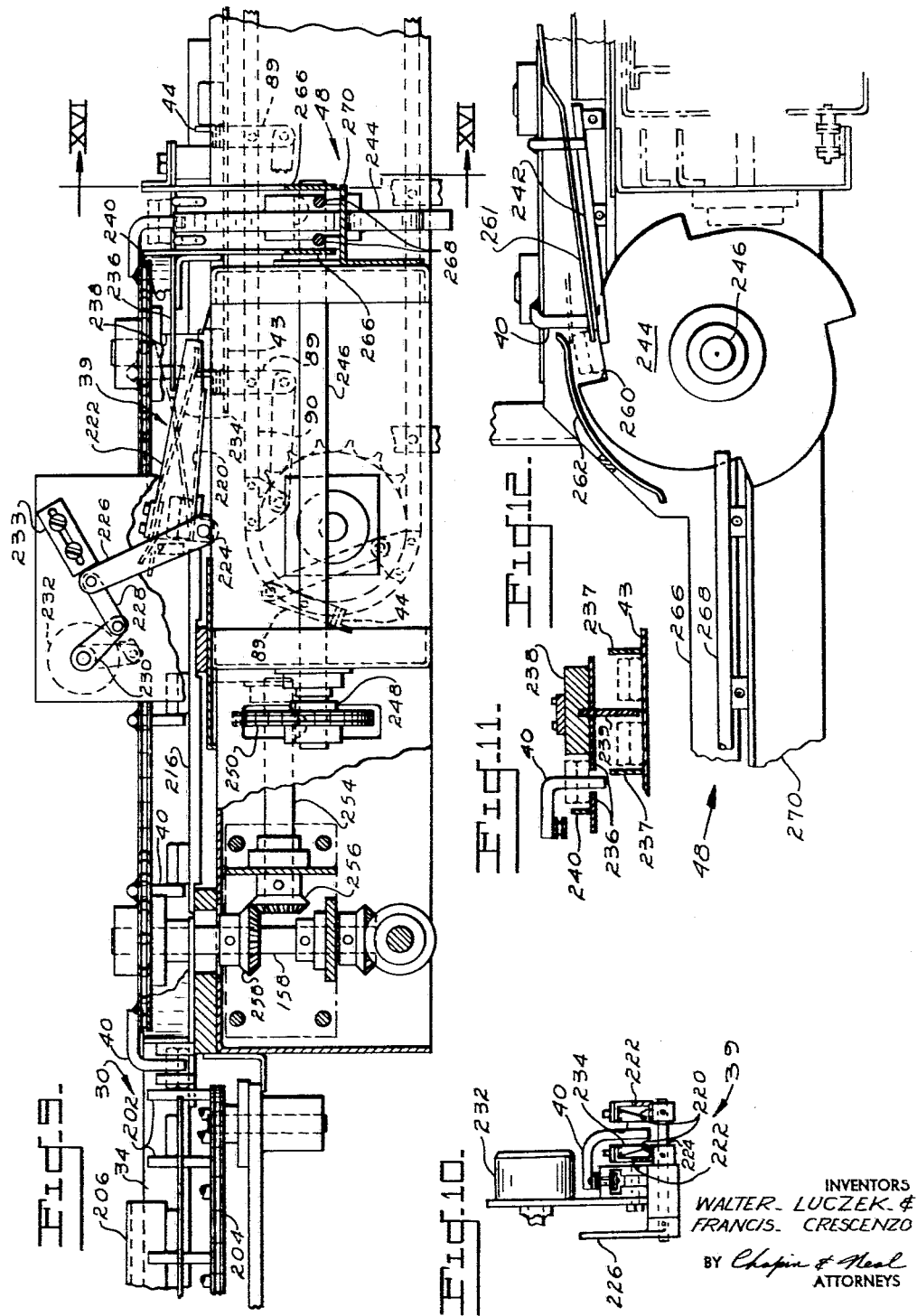

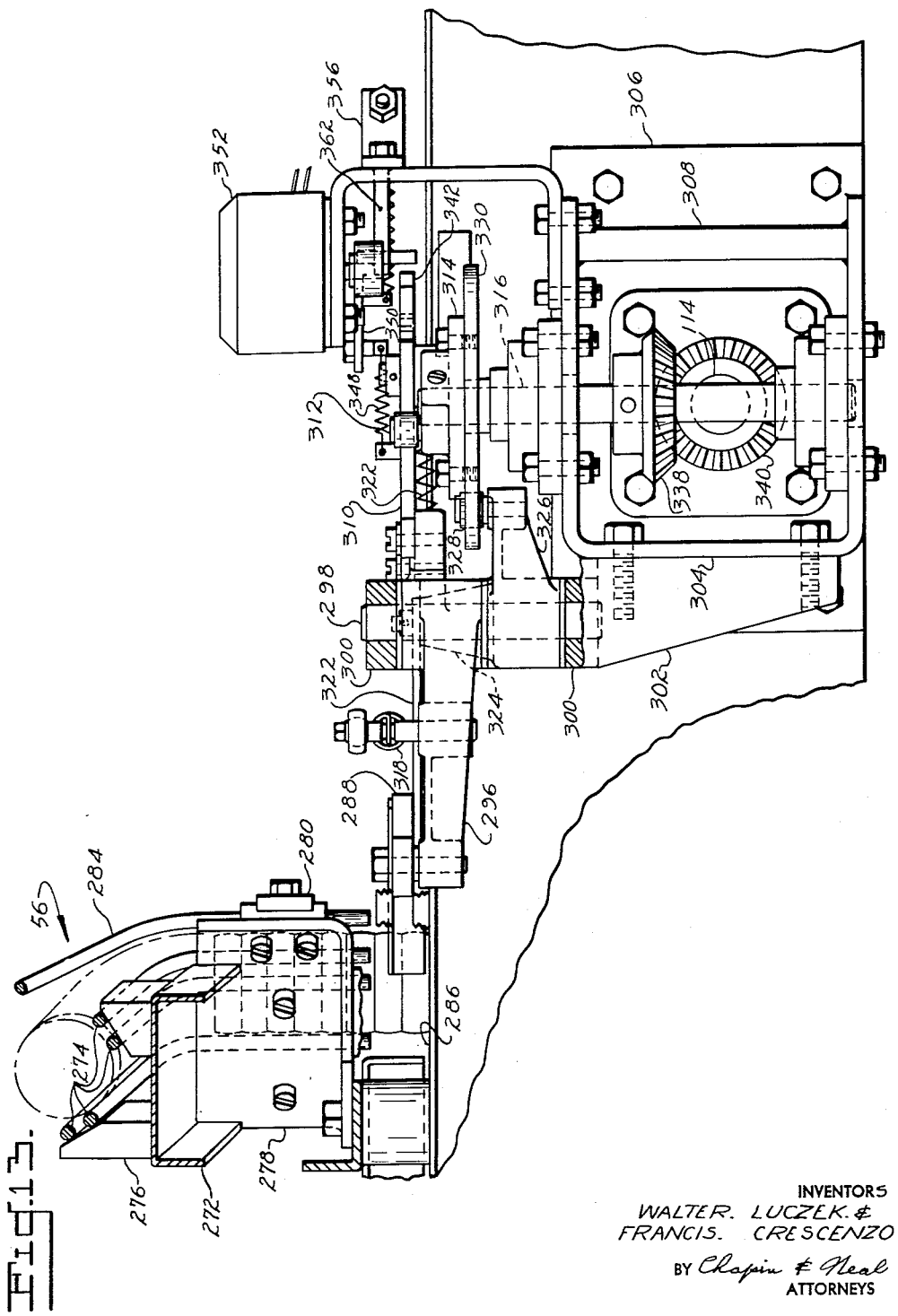

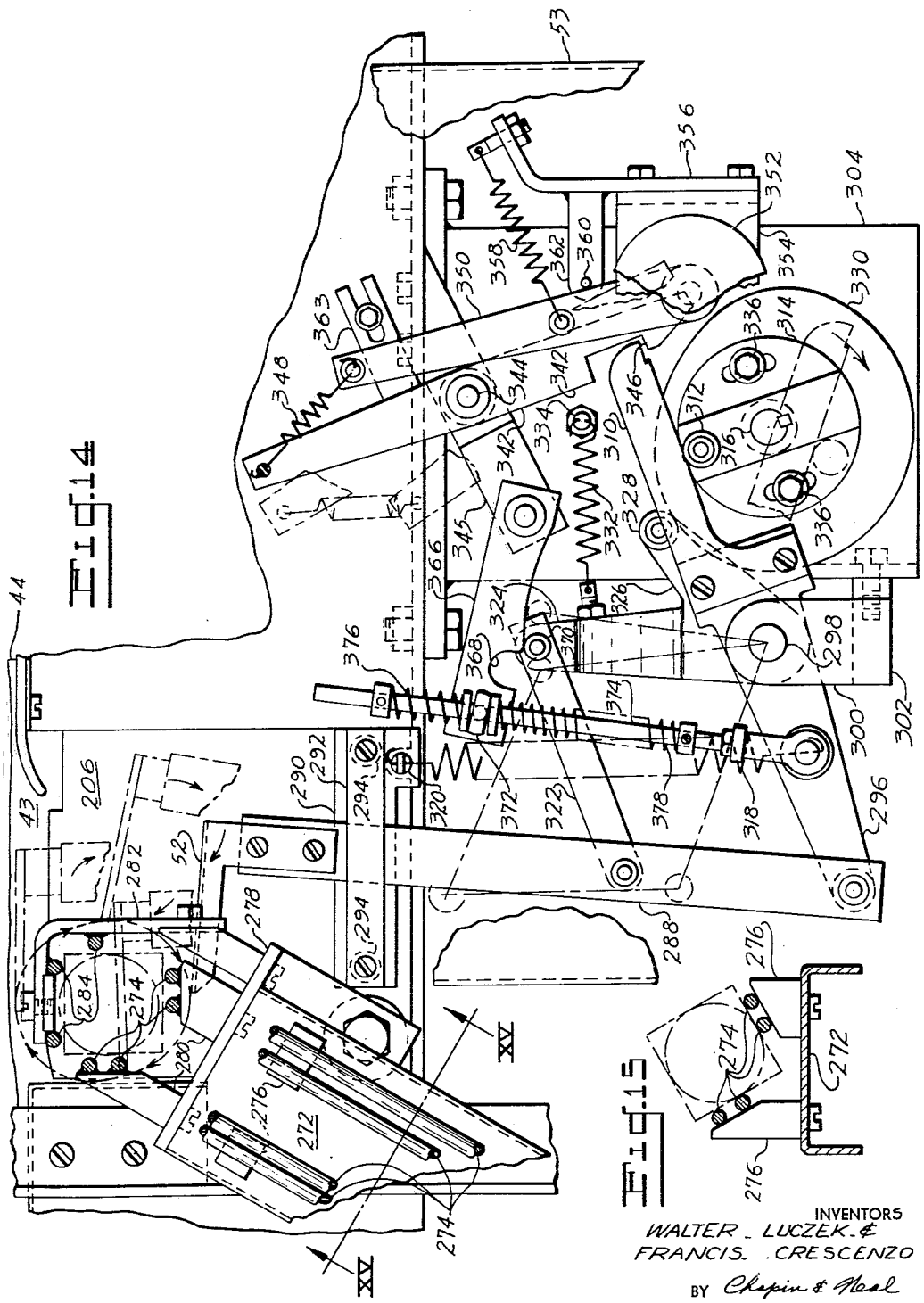

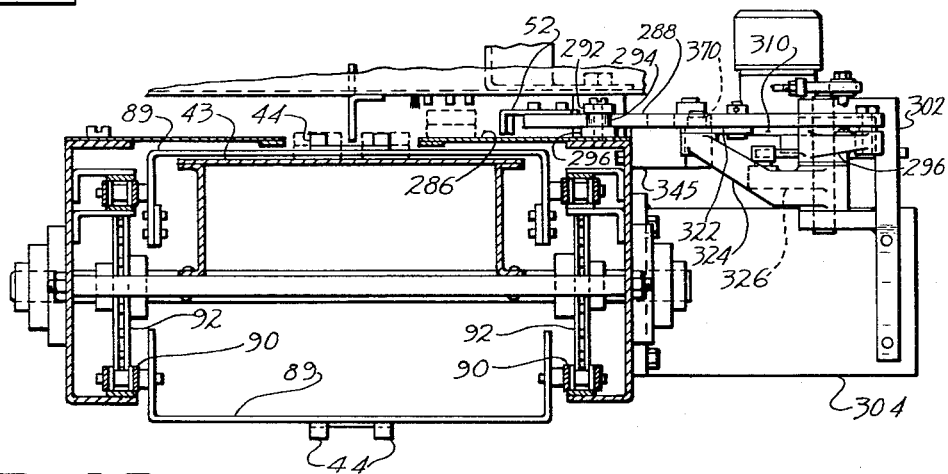
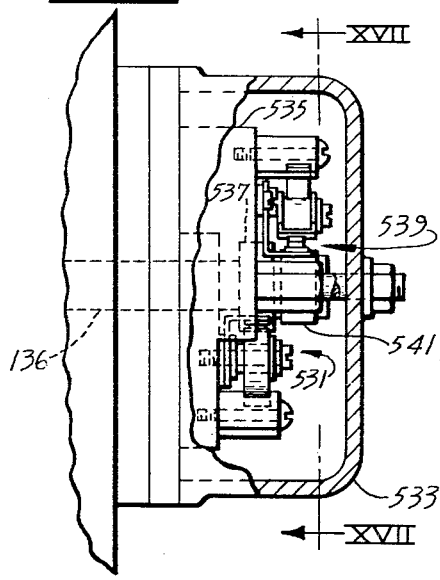
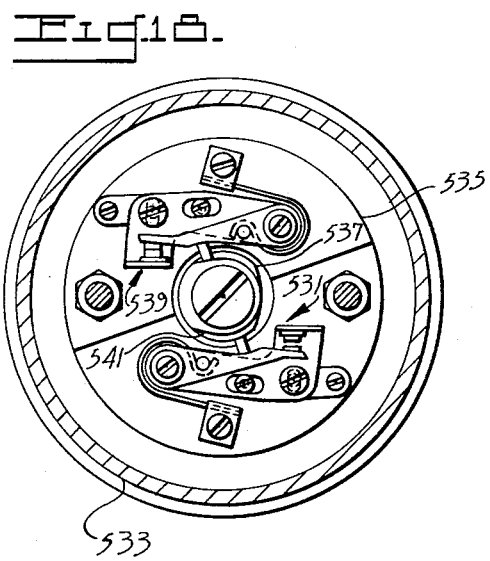

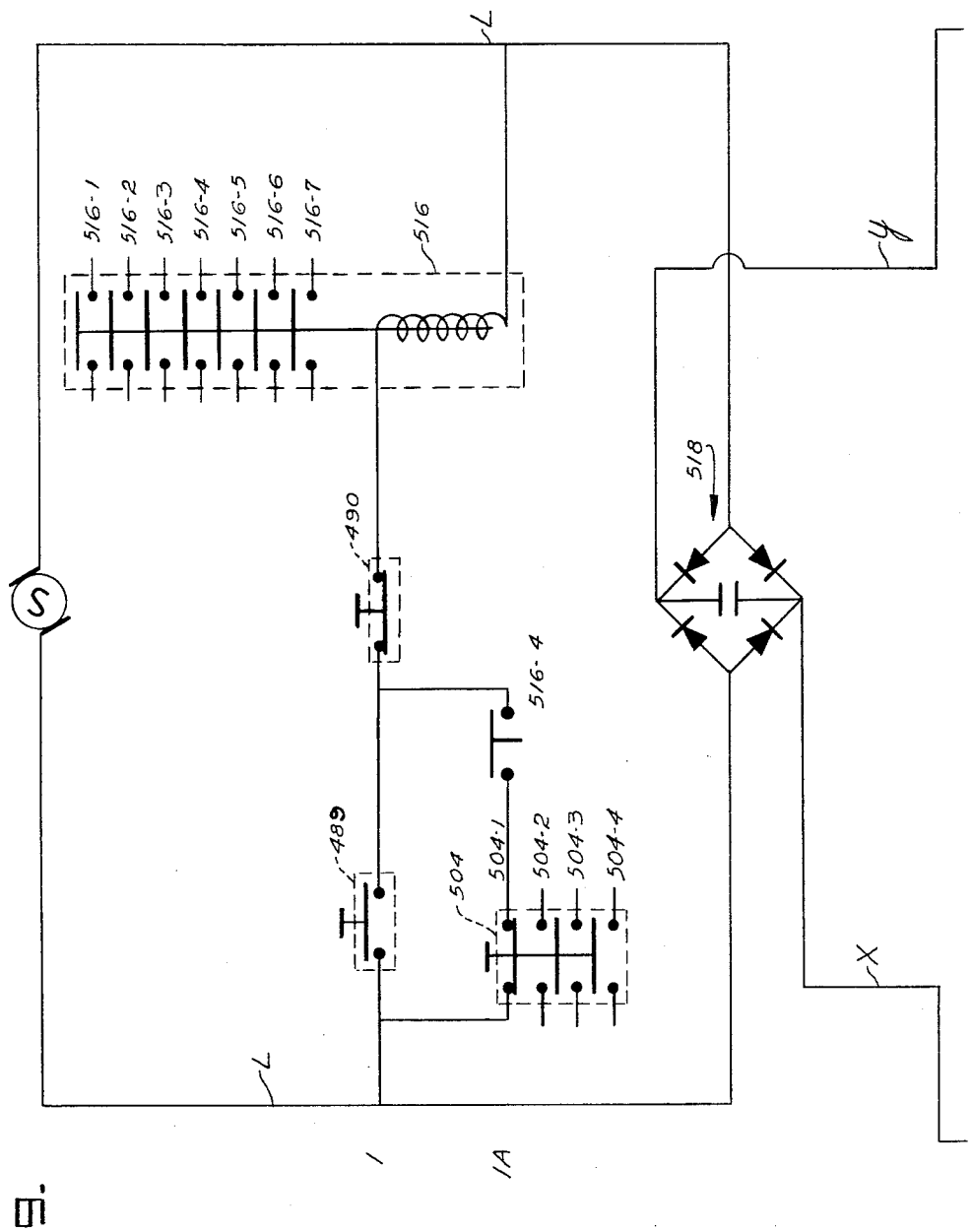

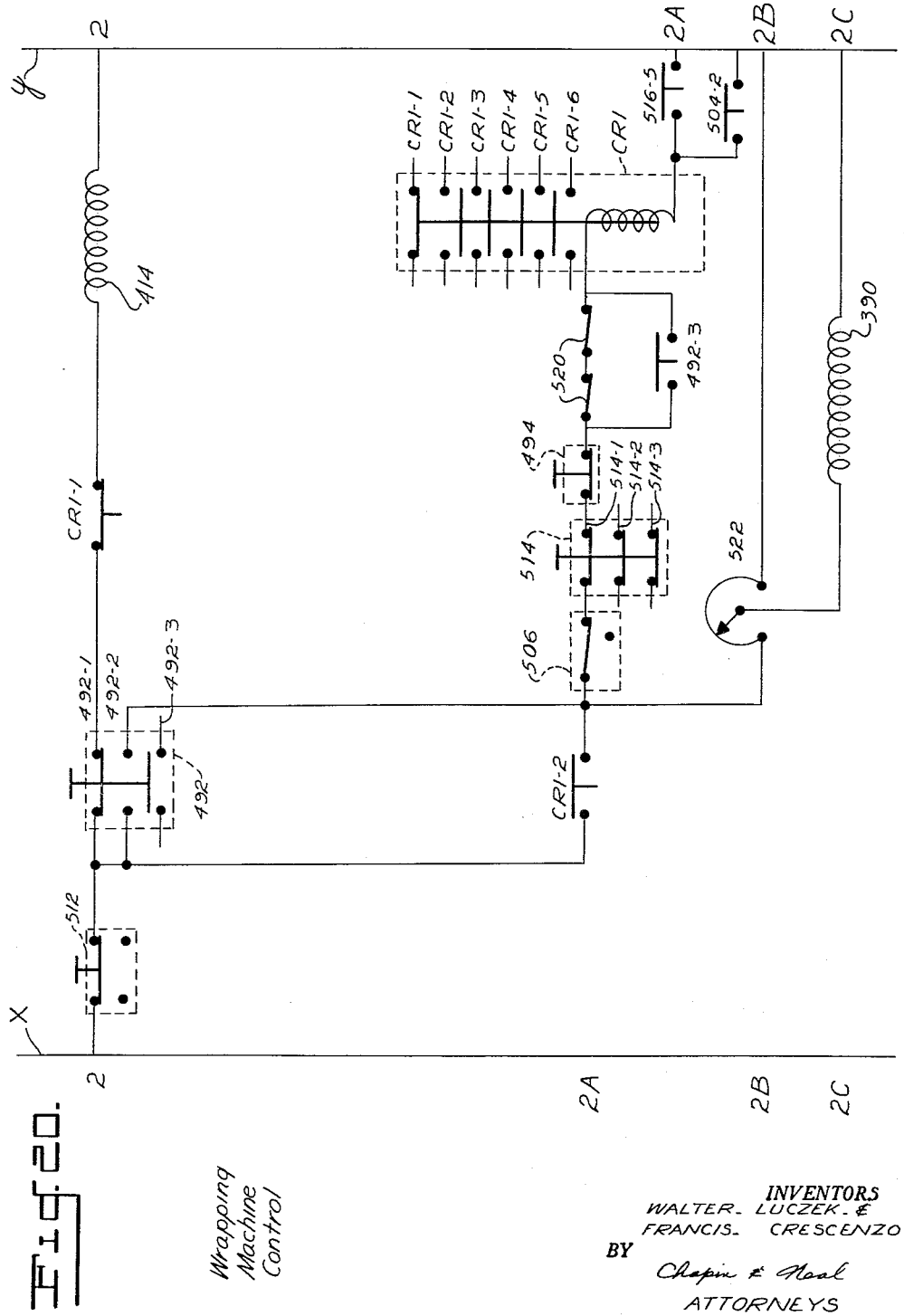

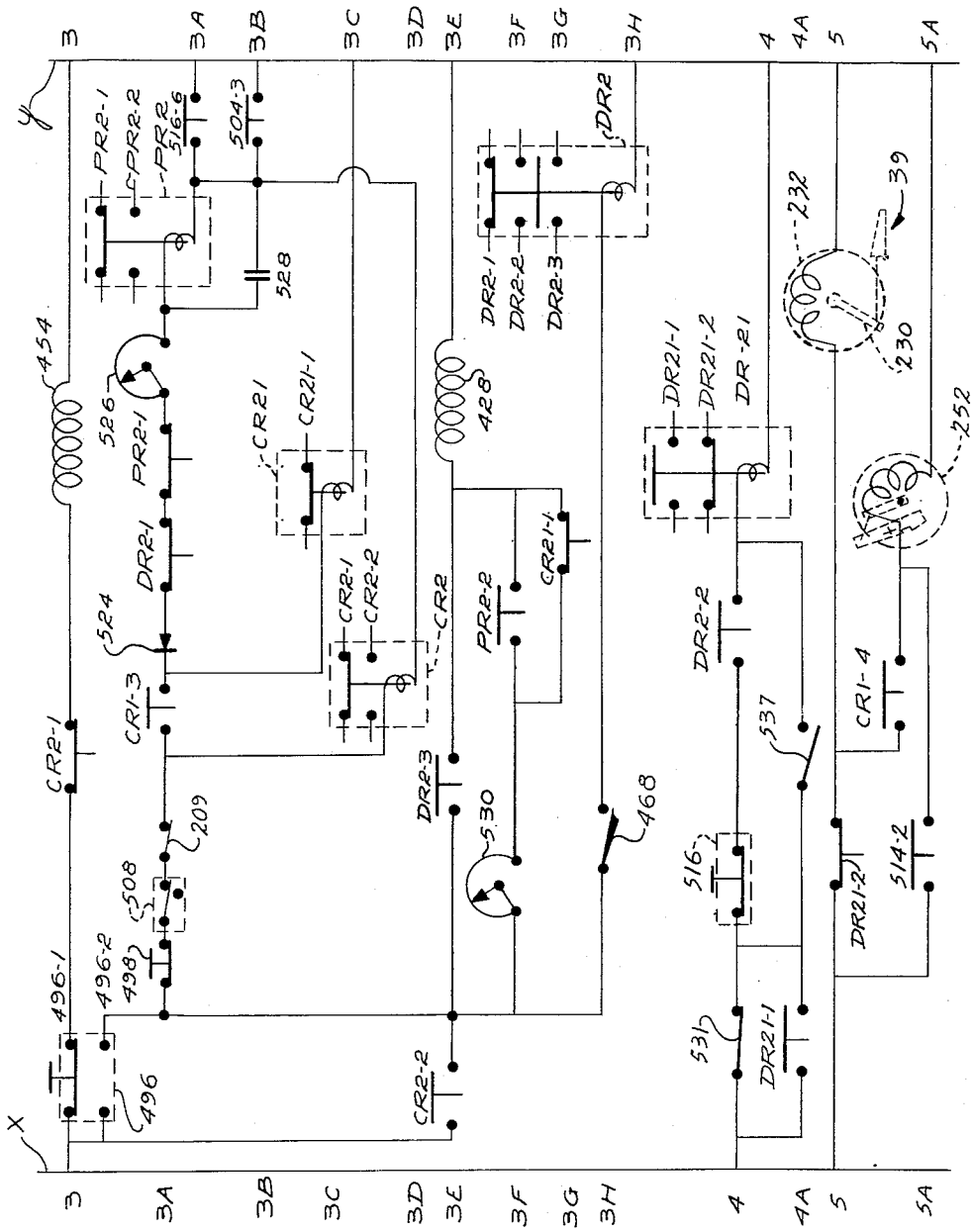

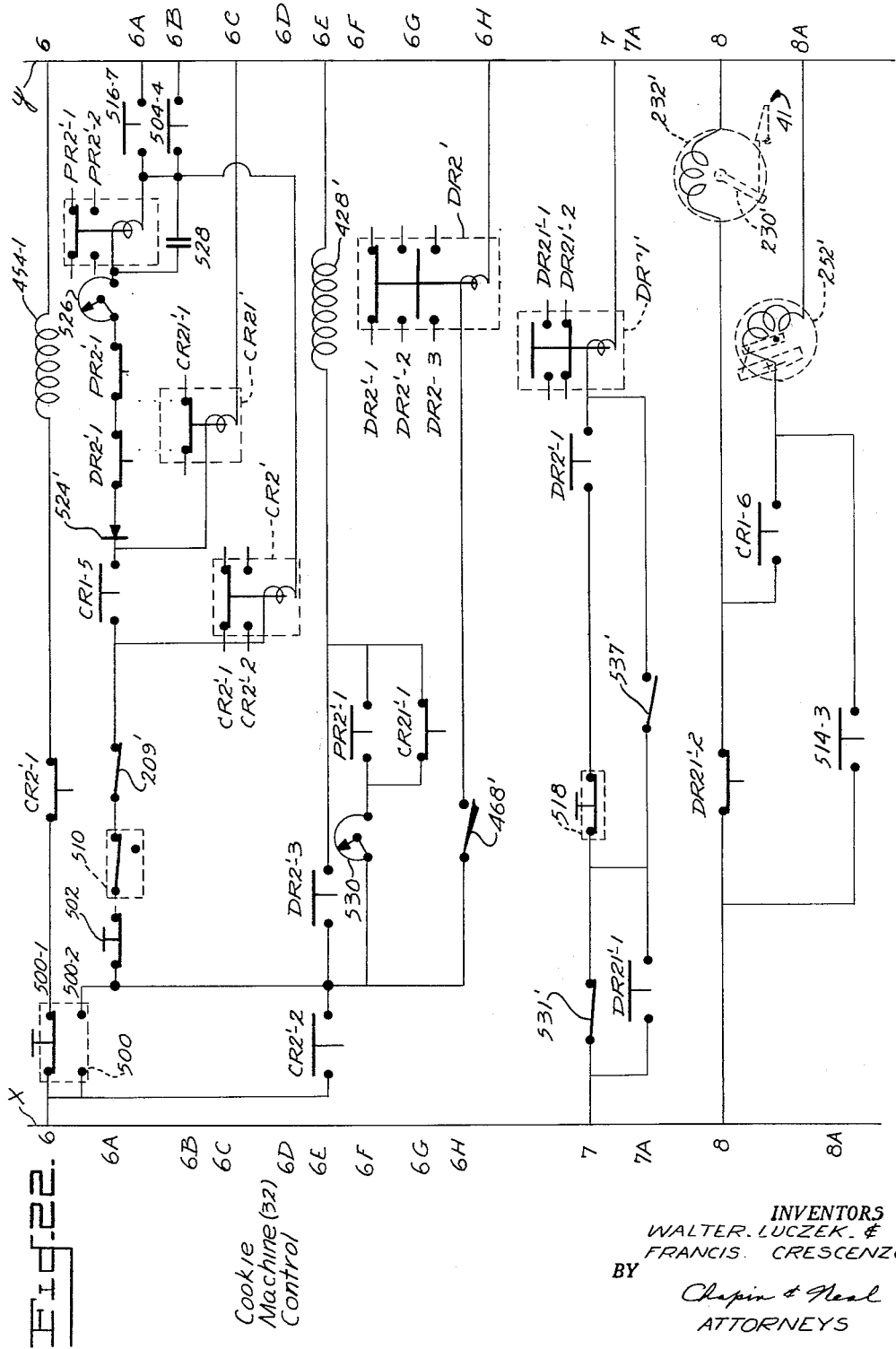

United States Patent Office 2,995,881
Patented Aug. 15, 1961

2,995,881
MACHINE CONTROL SYSTEMS
Walter Luczek, Indian Orchard, and Francis Crescenzo, Springfield, Mass., assignors to Package Machinery Company, East Longmeadow, Mass., a corporation of Massachusetts
Filed June 3, 1957, Ser. No. 663,202
37 Claims. (Cl. 53—168)

The present invention relates to automatic control systems and more particularly to such control systems for two or more machines which must be operated in synchronized fashion when operating in series.

The primary object of the invention is to provide a control system which is extremely flexible in providing alternative modes of operation for a plurality of machines which may be synchronized for series operation for the sequential treatment of articles.

Another object is to couple the operation of two or more machines in such a manner that one or the other or both may be operated in an independent manner without interruption.

Another object is to accomplish all of the above using a single power source.

The above and other related objects as well as the various constructional features of the invention will be apparent from a reading of the following description of the disclosure found in the accompanying drawings and the particular novelty thereof pointed out in the appended claims.

In the drawings:

FIG. 1 is an elevation diagrammatically illustrating the improved feed control system in association with a wrapping machine;

FIG. 2 is a plan view, on a slightly enlarged scale, of portions of the feed control system partly seen in FIG. 1;

FIG. 3 is a section, on an enlarged scale, taken on line III—III in FIG. 1;

FIG. 4 is a detailed view, on a further enlarged scale, of one of the clutching units seen in FIG. 3;

FIG. 5 is an end view, looking in the direction of arrow A in FIG. 1 and on an enlarged scale, of certain drive mechanism;

FIG. 6 is a detailed view, on a further enlarged scale, of another of the clutching units seen in FIG. 3;

FIG. 7 is a section taken on line VII—VII in FIG. 6;

FIG. 8 is a detailed plan view, on an enlarged scale of feed mechanism seen in FIG. 2;

FIG. 9 is an elevation, with certain portions broken away, of the feed mechanism seen in FIG. 8;

FIG. 10 is a section taken on line X—X in FIG. 8;

FIG. 11 is a section taken generally on line XI—XI in FIG. 8;

FIG. 12 is a section taken on line XII—XII in FIG. 8;

FIG. 13 is an elevation, on an enlarged scale, of auxiliary feed mechanism indicated in FIG. 2;

FIG. 14 is a plan view of the auxiliary feed mechanism seen in FIG. 11;

FIG. 15 is a section taken on line XV—XV in FIG. 14;

FIG. 16 is a section taken on line XVI—XVI in FIG. 9;

FIG. 17 is a detailed view, partly in section, of a control unit partially seen in FIG. 5;

FIG. 18 is a section taken on line XVIII—XVIII in FIG. 17; and

FIGS. 19, 20, 21 and 22 diagrammatically depict a simplified electrical circuit for the present control system.

While the present control system has general utility in coordinating flow of articles to or between a plurality of any type work treating or handling machines it finds particular utility in the packaging field. An illustrative set-up of such coordinated flow is illustrated in FIGS. 1 and 2.

The discharge ends of two conventional cookie making machines 30, 32 are seen in FIGS. 1 and 2. The cookies produced thereby are of the type comprising two superposed wafers with a cream filling therebetween. When operating in normal fashion, cookies are carried along channels 34, 36 of the machines 30, 32 respectively and are discharged onto a platform 38. Two cookies are discharged onto said platform in stacked relation from each of the machines 30, 32 and then are carried therealong by overhanging pushers 40, 42. The two pairs of cookies are advanced in side-by-side relation to the end of ramps 39, 41 from which (see also FIG. 9) they drop onto a second platform 43 spaced therebeneath. The discharge of said cookies onto said second platform is so timed that they are properly positioned in advance of a conveyor flight 44 which will feed said cookies in proper timed relation to a wrapping machine 46. Said wrapping machine, for illustrative purposes, is of the type disclosed in U.S. application Serial No. 439,682, filed June 28, 1954, now U.S. Patent No. 2,810,246, in the names of Cornock, Roberts and Lyon.

The above briefly described the normal flow of cookies to the wrapping machine 46. The present control system not only assures this normal flow but also provides for continued flow of cookies to the wrapping machine when one or another or both of the cookie making machines 30, 32 are either not delivering cookies or are not delivering cookies in proper timed relationship to the cycle of operation of the wrapping machine 46 as reflected by the advance of the conveyor flights 44. When such an event occurs any cookies being advanced by the pushers 40, 42 are automatically diverted outwardly and stacked on laterally extending stacking magazines 48, 50. At the same time further automatic means actuate either pusher 52 or 54 or both depending on which of the cookie machines are not properly feeding cookies to the wrapping machine. Movement of the pushers is controlled by mechanism within the boxes 53, 55. The pushers are arranged, upon actuation to discharge onto the platform 43, the two bottommost cookies from auxiliary feed magazines 56, 58 respectively. The operation of the pushers 52 and 54 is so timed that they will discharge cookies onto the platform 43 in proper timed relation to the advance of a conveyor flight 44. Thus the wrapping machine 46 may operate continuously independent of any failures of the cookie making machines.

Further flexibility is found in the ability to operate the cookie making machines 30, 32 independently of each other and also independently of the wrapping machine 46. When so operated, cookies are automatically diverted and stacked in the respective stacking magazines 48 and 50.

Other features of the invention will be found in the use of a single motor to accomplish all of the above. These plus further features of novelty herein will be apparent from the following description of the construction and functional operation of the disclosed embodiment.

The single power source, above referred to, comprises an electric motor 60 (FIG. 1) with a pulley 62 affixed to its output shaft. A pulley 64 is secured to a cross shaft 66 appropriately journaled on frame members of the machine 46. Also secured to the shaft 66 are sprockets 68, 70, with the pulley 64 drivingly connected to the pulley 62 by a belt 72 (see also FIG. 3). The constantly rotating sprocket 68 is connected to a sprocket 74 through a chain 76. The sprocket 74 is rotatably mounted on a further cross shaft 78 and is selectively coupled thereto by a magnetic clutch unit 80.

When so coupled the shaft 78 becomes the main drive shaft for the wrapping machine 46 as well as furnishing power for auxiliary feed mechanism including the pushers 52 and 54. Thus a sprocket 82 secured to shaft 78 drives, through chain 84, the various paper feed and folding instrumentalities of the machine 46 in the manner taught in the mentioned application and a second sprocket 86, through chain 88, drives a conveyor comprising spaced chains 90 to which are attached to conveyor flights 44. The chains 90 are trained over appropriately mounted sprockets 92. Further construction details of the wrapping machine infeed conveyor will be found in FIGS. 9 and 16. The flights 44 are carried on U-shaped straps 89 which are pivotally mounted on the chains 90 and maintained in upright position over plate 43 by links 91. This arrangement also reduces the space required for the flights to pass around the sprockets 92 (see FIG. 9). Appropriate guiding means may be provided for the chains 90 in the manner shown in FIG. 16.

The wrapping machine drive shaft 78 also rotates a synchronizing shaft 94 (FIG. 3) by way of sprockets 96, 98 secured to the shafts 78, 94 respectively and a chain 100 entrained therearound. A second sprocket 102 (FIG. 2) is formed integrally with the sprocket 98 and drives an upwardly disposed chain 104. An idler sprocket 106 is driven by the chain 104 and a second sprocket 108 integral therewith drives a sprocket 110 through a chain 112. The sprocket 110 is fast upon a shaft 114 which is the power shaft for the auxiliary feed mechanism to be described in detail later.

Referring back to cross shaft 66 (FIG. 3), the sprocket 70 drives a sprocket 116 through chain 118. The sprocket 116 is rotatably mounted on the synchronizing shaft 94. Two magnetic clutch units 124, 126, one on either side of the sprocket 116, are provided to respectively couple sprockets 128, 130 to the sprocket 116 in a selective synchronized manner explained below. When the sprocket 128 is clutched to and driven by the sprocket 116, a sprocket 132 (FIGS. 1 and 5) is driven through a chain 134. The sprocket 132 is fast upon a shaft 136 to which are also secured sprockets 138, 140. The sprocket 138, through chain 142, connects with the conventional drive of the cookie making machine 30, while the sprocket 140, through chain 144, drives a sprocket 146 and shaft 148. The shafts 136 and 148 extend between and are journaled on an outer frame member 150 and interior frame member 152. The shaft 148 carries a bevel gear 154 which meshes with and rotates a corresponding gear 156 which is secured to an appropriately journaled vertical shaft 158. A sprocket 160 (see also FIGS. 2 and 8) is secured to the upper end of shaft 158 and drives a chain 162 which is entrained around idler sprockets 164, 166. The overhanging pushers 40 extend from the chain 162 and are thus driven to advance cookies from the machine 30 to the infeed conveyor of the wrapping machine 46.

The cookie making machine 32 and its associated pushers 42 are driven in a manner corresponding to that just described. Referring back to FIG. 3 when sprocket 130 is coupled to sprocket 116 by selective actuation of the magnetic clutching unit 126, chain 168 (FIG. 5) drives a sprocket 170 and with it shaft 172 as well as sprockets 174 and 176 secured thereto. The sprocket 174, through chain 178, connects with the conventional drive of the cookie making machine 32, while the sprocket 176, through chain 180, drives a sprocket 182 and with it shaft 184. The shafts 172 and 184 extend between and are journaled on an outer frame member 186 and the inner frame member 152 and, it should be noted, are separate and distinct from the shafts 136 and 148. The shaft 184 carries a bevel gear 188 which drives a second bevel gear 190 and with it a vertical shaft 192. A sprocket 194 (see also FIG. 2) is secured to the upper end of shaft 192 and drives a chain 196 which is entrained around idler sprockets 198, 200. The overhanging pushers 42 extend from the chain 196 and are thus driven to advance cookies from the machine 32 to the infeed of the wrapping machine 46.

As has been above described the cookie making machines are separate and distinct with each having its own drive means, however their manner of operation, as well as the means for advancing cookies or otherwise feeding cookies to the wrapping machine, are identical and thus, from this point on the present description will be primarily limited to the machine 30 and its associated mechanism.

The machine 30, other than the manner in which it is incorporated in the present control system, is of conventional construction having means for forming cookies of the type comprising two superposed wafers with cream filling in between.

Each cookie is carried along the discharge channel 34 (FIGS. 8 and 9) by an upstanding pin 202 extending from a chain 204. As the cookies pass along the channel 34 they are carried beneath a missing cookie detector plate 206 which has a depending edge extending lengthwise a distance somewhat greater than the spacing between the pins 202. The plate 206 is pivotally mounted on a pin 208 above a missing cookie detector switch 209. The length of the flange of plate 206 is such that it will be maintained in a raised position by first one cookie and another; however should a cookie be missing the plate 206 will drop downwardly and actuate switch 209.

As has been mentioned the platform 38 is spaced beneath the level of channel 34. This spacing approximates the height of the particular cookies being handled. The spacing between the pins 202 as related to the spacing of the pushers 40 and their relative speeds are such that one cookie will be discharged onto the platform 38 and then another cookie shoved on top of the first cookie in advance of each pusher 40. The cookies are then advanced, in this stacked relation, along the platform 38 as guided by a raised dart-shaped member 212 and a curved portion of flange 214. The platform 38 may terminate at the apex of the member 212 and rods 216 may form a continuation thereof. Cookies are maintained centrally of the rods 216 by a central rib 218 and a straight portion of the flange 214. Further advance of the cookies brings them to the ramp 39 which comprises spaced underlying flanges 220 with an upstanding flange 222 extending from each flange 220 (see also FIG. 10). This composite ramp is mounted on a transverse pivot pin 224 by way of depending tabs. A lever arm 226 is secured to the pin 224 and is connected, by way of a link 228, to the arm 230 of a rotary solenoid 232. The weight of the ramp 39 maintains it in its lower position as limited by a stop 233 (seen only in FIG. 9). Spring fingers 234 (FIGS. 9 and 10) are secured to inturned portions of the upstanding flanges 222, overlie and extend beyond the ends of the underlying flanges 220.

Thus when the pushers 40 are properly synchronized with the infeed conveyor flights 44 a pair of stacked cookies will be advanced down the ramp 39 and drop off the ends of the underlying flanges 220 onto plate 43. This dropping action is facilitated by the spring fingers 234 which assure that the cookies will remain in stacked relation. If such synchronization has not been established between the machines 30 and 46, automatic means actuate the solenoid 232 to raise the ramp to an upper position wherein the ramp flanges 220 are in alignment with curved rails 236. When the ramp is in this upper position cookies will be diverted away from the machine 46 and carried along the curved rails 236 by the pushers 40 as guided by dart-shaped member 238 and a flange 240. FIG. 11 illustrates both conditions, that is when synchronized cookies will be advanced along the lower platform 43 and when the ramp is raised to divert cookies they will advance along the rails 236. It will be seen that cookies on the platform 43 are guided by outer ribs 237 and a central rib 239 depending from the member 238. Further movement of the pushers 40 will carry the cookies to a pair of downwardly sloping rods 242 leading to a stacking wheel 244 (FIG. 12).

The stacking wheel 244 is secured to one end of a shaft 246 (FIGS. 8 and 9) which carries a sprocket 248 at its other end. The sprocket 248 is driven by a chain 250 extending around a sprocket 252, which sprocket is fast upon one end of a shaft 254. The shaft 254 has a bevel gear 256 affixed to its other end, which gear meshes with and is driven by a bevel gear 258 secured to the vertical shaft 158 which is driven in the manner previously described. The stacking wheel 244 will thus rotate in fixed timed relation to the pushers 40.

With this arrangement, each diverted pair of cookies will be received in one of the pockets 260 formed in the stacking wheel 244. The cookies are urged into the pockets 260 by a spring finger 261 extending from the dart-shaped member 238 (FIGS. 8 and 12). As the cookies are rotated by the stacking wheel, they are retained in the pockets 260 by a retaining plate 262 (FIG. 12). The cookies will be received in the laterally and horizontally disposed stacking magazine 48 comprising side panels 266 and rails 268 supported by an underlying angle iron 270.

If cookies are being diverted to the magazine 48, the normal operation of the control system will automatically cause other cookies to be discharged from the auxiliary magazine 56 by pusher 52 in the following manner.

The magazine 56, at its upper end, comprising a downwardly angled channel iron 272 (FIGS. 13, 14, 15 and 16) which support rails 274 by way of lugs 276. A fixed vertical plate 278 is joined with the lower end of channel iron 272 and provides support for vertical portions of the rails 274 by way of lugs 280 (FIG. 14). An angle bracket 282 extends from one lug 280 and supports rails 284 which maintain the lowermost cookies in the magazine 48 in vertical registration. The bottommost cookie rests on a stop or plate 286 and the rails 274, 284 forming the lower end of magazine 48 are spaced above the plate 43 a distance sufficient to allow the pusher 52 to discharge the two bottommost cookies onto the plate 43.

Discharging movement of the pusher 52 may be provided in the following manner. The pusher 52 (FIGS. 13, 14 and 16) is mounted at one end of a bar 288 which is restrained between a wear plate 290 (on plate 286) and a top plate 292 spaced thereabove by collars 294. The other end of the bar 288 is pivotally connected to a lever 296 which in turn is pivotally mounted on a pin 298 extending between ears 300 of a bracket 302. Said bracket is secured to the outer end of a U-shaped bracket 304 which is welded on a mounting plate 306 secured to the side of the machine frame. In passing it can be seen that a vertical bar 308 may be provided to give greater rigidity to the U-shaped bracket 304.

Referring back to lever 296, a hardened arm 310 is secured thereto and extends over the U-shaped member 304. The arm 310 is arranged to follow a roller 312 which extends from a plate 314 fast upon a vertical shaft 316. The arm 310 is urged toward the roller 312 by a spring 318 (FIG. 14) extending between the lever 296 and a pin 320 on the machine frame. Rotation of the roller 312, which acts as a cam, thus may impart movement to the pusher arm 288. Movement of the pusher arm 288 is also controlled by other means including a link 322 pivotally connected to an intermediate portion of arm 288 and its other end to a bell crank arm 324. Said bell crank is pivotally mounted on the vertical pin 298 and has a second arm 326 carrying a roller 328 at its outer end. The roller 328 is urged into engagement with a cam 330 by a spring 332 extending between the arm 324 and a stud 334 threaded into the bracket 304. The cam 330 is secured to plate 314 by screws 336 and rotates therewith. The shaft 316 drives the roller 312 and cam 330 in the following manner. A bevel gear 338 is secured to said shaft and meshes with a bevel gear 340 secured to the shaft 114, which shaft 114 rotates at all times when the wrapping machine 36 is in operation as previously explained.

Movement of the pusher 52 is thus the compound result of the motions imparted by the roll 312 and cam 330. The resulting path of movement of the pusher 52 is illustrated in FIG. 14 and shows the manner in which the pusher advances beneath the magazine 56 to discharge two cookies onto the platform 43 and then moves forwardly of the magazine as it is retracted rearwardly thereof to a position where it may again discharge two cookies. Since the pusher 52 moves entirely from beneath the magazine 56 during this rearward movement ample time is allowed for cookies to move down the magazine 56 and for the bottommost cookie to settle on the plate 286 preparatory to the discharge of subsequent cookies.

The above described operation occurs only when cookies are not being properly advanced from the cookie machine 30. When cookies are being properly advanced, the pusher 52 is rendered inoperative and held in a retracted position by the following means.

A lever 342 is pivotally mounted on a fixed pin 344 extending from an arm 345 and has a latch 346 formed at one end in obstructive relation with the outer end of arm 310. A spring 348 connects the other end of lever 342 with the outer end of a solenoid arm 350. Said solenoid arm is connected to the shaft of a rotary solenoid 352. The solenoid 352 is mounted on a bracket 354 which in turn is secured to the U-shaped bracket 304. A fixed arm 356 is secured to the bracket 354 and carries one end of a spring 358 which is connected to and urges the solenoid arm 350 in a clockwise direction as limited by a stop pin 360 upstanding from a projection 362 of the fixed arm 356. Movement of the latch lever 342 is also limited by an adjustable stop 363. At the outer end of arm 345 a bar 366 is mounted, said bar having a recess 368 which is adapted to receive a roller 370 carried on the outer end of bell crank arm 324. It will be noted that the recess 368 receives the roll 370 when the crank arm 324 is displaced to one extreme of its stroke by the cam 330. A screw eye 372 is threaded into the outer end of bar 366 and receives a rod 374 which is pivotally mounted on the lever 296. A relatively strong spring 376 urges the screw eye 372 away from the outer end of rod 374 while a relatively weak spring 378 maintains the screw eye in engagement with the spring 376 and at the same time provides a yieldable connection between the lever 296 and arm 366.

When the solenoid 352 is deenergized the latch 346 will be in obstructive relation with the arm 319 (as shown in FIG. 14) thus preventing the lever 296 from imparting movement to the pusher 52. With the lever 296 locked in its lower position, the spring 376 will swing the arm 366 so that the recess 368 receives roller 370 when the bell crank arm 324 is swung to the extreme of its stroke by the cam 330. Thus no movement will be imparted to the pusher 52 by the link 322 or lever 296 and the pusher rendered inoperative.

When the solenoid is energized, the arm 350 is swung to the phantom position seen in FIG. 14. This action can occur during any portion of the machine cycle, however, the spring 318 maintains the end of arm 310 in such firm engagement with the latch 346 that the spring 348 cannot withdraw it from obstructive relation until the roller raises said arm in the manner illustrated. The spring 348 will then move the lever 342 to the indicated phantom position allowing the arm 310 to follow the roller 312. Then as the lever 296 moves in a clockwise direction the arm 366 will be displaced to release the roller 370 and permit the crank arm roller 328 to follow cam 330 thereby imparting movement to the pusher 52 in the manner above described.

Referring back to FIGS. 1, 3 and 4, the first step in operating the present system is to actuate the motor 60. When this is done rotation is imparted to shaft 66 (FIG. 3) and sprockets 116 and 74 are driven. At this time any one or all of the cookie making machines 30, 32 and the wrapping machine 46 may be set in operation by selectively actuating the respective clutching units 124, 126 or 80.

The detailed construction of clutching unit 80 may best be understood from FIG. 4. Sprocket 74 is rotatably mounted on shaft 78 on a ball bearing 380 through an intermediate hub member 382. A clutch plate 384 is mounted on and rotates with the hub 382 and sprocket 74. The mounting means for the clutch plate 384 include a plurality of spaced studs 386 (one only shown) threaded into the hub 382. The plate 384 is slidaly mounted on said studs and urged into engagement with the hub 382 by a compression spring 388 surrounding each stud 386. Spaced from the plate 384 is an electrical coil 390 having a mounting plate 392. The mounting plate 392 is secured to a wheel 394 as by screws 396 passing through a spacer 398. The wheel 394 carries a ring 400 of insulating material having a raised rib 402 which separates a pair of slip rings 404. The slip rings 404 are engaged by electrical contacts 406 in conventional fashion to complete a circuit through the rotatable coil 390. A brake plate 408 is also mounted on the wheel 394 by a plurality of studs 410 (one only shown) threaded therein. The plate 408 is slidable on the studs 410 and urged toward said wheel by a compression spring 412 surrounding each stud. Adjacent the plate 408 is a brake coil 414 having a mounting plate 416 secured to a stationary frame member 418 as by screws 420.

As illustrated in FIG. 4, the brake coil 414 is energized and the brake plate 408 is pulled into locking engagement therewith. In this manner positive means are provided for rendering the wrapping machine 46 inoperative. This condition will exist when power is supplied to the electrical control circuit which has yet to be described. When it is desired to operate the wrapping machine 46, the coil 414 is deenergized to release the brake plate 408 and the coil 390 is energized to bring the clutch plate 384 into driven engagement therewith. Thus through the wheel 394 rotation is imparted to the wrapping machine drive shaft 78 which is keyed thereto. It will also be remembered that the drive for the conveyor flights 44 and the auxiliary feed pusher 52 are driven through chain drive systems from the shaft 78 so that both are synchronized or in fixed timed relationship to the operation of the wrapping machine 46.

In order to describe the constructional details of clutching unit 124, reference is next made to FIG. 6. The sprocket 116 is rotatably mounted on the shaft 94 by way of a ball bearing 421 and centered thereon by collars 423. A clutch plate 422 is mounted for rotative movement with the sprocket 116 on a plurality of studs 424 (one only shown) threaded into the hub of said sprocket. The plate 422 is urged toward said sprocket hub by a compression spring 426 surrounding each stud 424. Adjacent the plate 422 is a coil 428 secured on one side of the sprocket 128 which in turn is secured to the hub of a wheel 430, as by screws 432. The wheel 430 is fast upon one end of a sleeve 434. A collar 438 in combination with one of the collars 423 maintains the sleeve 434 in a fixed lateral position on the shaft 94. A ring 440 of insulating material surrounds the periphery of wheel 430 and has a raised rib 442 which separates a pair of slip rings 444. The slip rings are engaged by electrical contactors 446 in conventional fashion to complete a circuit through the rotatable coil 428.

Also attached to wheel 430 is brake plate 448 which is slidable on a plurality of studs 450 (one only shown) threaded into said wheel 430. A compression spring 452 surrounds each stud 450 and urges the plate 448 towards the wheel 430. Adjacent the plate 448 is a brake coil 454 which is attached to a mounting plate 456 which in turn is secured to a fixed frame member or web 458 as by screws 460. On the other side of the web 458, a wheel 464 is secured to the sleeve 434 and to which is secured a cam 466 (see FIG. 7). Ball bearings 436 provide for relative rotation between the shaft 94 and the various elements secured to sleeve 434. Spaced outwardly of the cam 466 is a microswitch or synchronizing switch 468 which is mounted at one end of a plate 470. The plate 470 in turn is secured to a wheel 472 by screws 474, and the wheel 472 is keyed to and rotates with the synchronizing shaft 94. A ring 476 of insulating material surrounds the periphery of wheel 472 and has an upstanding rib 478 which separates slip rings 480, said slip rings being engaged by electrical contactors 482 to complete a circuit through the switch 468 when it is closed by its actuating lever 484 being displaced by the cam 466 (see also FIG. 7).

The electrical control circuit is so arranged that if the wrapping machine is not in operation, clutching unit 124 may be actuated to simultaneously deenergize the brake coil 454 and energize the clutch coil 428. The sprocket 128 is thus coupled to the sprocket 116 and the cookie machine 30 driven thereby. With the wrapping machine 46 inoperative cookies will be carried away from the machine 30 by pushers 40 and diverted to the storage magazine 48.

If the wrapping machine 46 is running then the electrical circuit is such that upon actuation of the clutching unit 124, the brake coil 454 will be deenergized and simultaneously clutch coil 428 will be energized in a pulsing fashion. Thus the sprocket 128 will be rotated and yet will not be fully coupled to the driving sprocket 116. It will be remembered that the synchronizing shaft 94 will also be rotating and with it the synchronizing switch 468. The cam 466 will be rotating in the same direction as, but at a slower rate than, switch 468 until said switch is closed by cam 466 for a sufficient length of time for the electrical circuit to fully energize clutch coil 428, whereupon sprocket 128 will be fully coupled to sprocket 116. When so coupled said sprocket 128 will have a predetermined relationship with the synchronizing shaft 94 and the cookie making machine 30 and pushers 40 will be synchronized with the wrapping machine 46.

If the cookie machine 30 is in operation and it is later desired to operate the wrapping machine 46, clutching unit 80 is actuated as above described. The electrical circuit is such that the clutch coil 428 will receive pulses of current until sufficient slippage of the sprocket 128 with respect to sprocket 116 occurs to permit the synchronizing switch 468 to be closed by cam 466, whereupon the clutch coil will again be fully energized and the cookie machine 30 and wrapping machine 46 will operate in synchronization.

The construction and operation of clutching unit 126 is essentially identical to that of the above described clutching unit 124 and will not be given in detail. Suffice it to say, that the cookie making machine 32 is arranged for independent operation or synchronized operation with the wrapping machine 46 as is the cookie machine 30.

A simplified showing of the electrical control circuit is found in FIGS. 19 through 22. By way of preamble it will be pointed out that many conventional means in this circuit have been omitted for clarity, thus fusing means and other protective devices as well as adjustable resistors and capacitors to adapt standard components for any specialized conditions that may exist are not shown.

The various control switches and the other components of the electrical circuit may be mounted in any convenient manner as by the switch panel 486 (FIG. 1) and mounting box 488. The panel 486 may include a motor start switch 489, a motor or master stop switch 490, a start switch 492 and a stop switch 494 for the wrapping machine 46, a start switch 496 and a stop switch 498 for the cookie machine 30, and a start switch 500 and stop switch 502 for the cookie making machine 32. Further there are provided selector switches 504, 506, 508 and 510 which respectively and independently may be set for regular running or jogging of the motor 60, wrapping machine 46, cookie machine 30 and cookie machine 32. There is also provided a selector switch 512 which may be set for automatic energization of the brake coil 414 or to release said brake. Also a selector switch 514, may be provided for feeding of cookies from the magazines 56, 58 at any time machine 46 is in operation or only when the machines are not in synchronization. In addition switches 516, 518 are provided to permit diversion of the cookies from machine 30 or 32 at any time as for inspection purposes.

In the illustrated circuit the run-jog selector switches 504, 506, 508 and 510 are all set to their "run" positions. Switch 512 is set for automatic energization of brake coil 414, and switch 514 is set for automatic magazine feed rather than continual magazine feed.

With the above described settings of the selector switches in mind, reference may now be made to the motor control circuit of FIG. 19. The motor start switch 489 (line 1) and motor stop switch 490 are arranged in series with the coil of a relay 516 across lines L, L which are connected to a suitable source of alternating current. A set of closed contacts 504–1 (of motor run-jog selector) (line 1A) and a set of main relay contacts 516–4 are connected in parallel across the motor start switch 489.

Said motor start switch may be closed to energize relay 516 and then released as the relay remains energized through contacts 504–1 and 516–4. The motor 60 is thus set in motion as circuits are completed to its three-phase windings through the upper three main relay contacts 516–1, 2 and 3. The remaining contacts of the main relay are closed as a preliminary to actuation of other circuits yet to be described.

The lines L, L are connected to a rectifier 518 which provides a source of direct current potential across lines x and y. The lines x and y extend to and supply power for the remainder of the control circuit now to be described.

The wrapping machine controls (FIG. 20) comprise the brake selector switch 512 (line 2), contacts 492–1 (of the start switch), normally closed relay contacts CR1–1 and brake coil 414. It will be seen that normally when the wrapping machine 46 is not in operation, it is locked by reason of said brake coil being energized.

Upon depressing the plunger of start switch 492 two other circuits may be completed, one through line 2A to energize relay CR1 and the other through line 2C to energize clutch coil 390. Line 2A includes on one side of relay CR1, the run-jog selector switch 506, contacts 514–1 of the magazine selector switch, the wrapping machine stop switch 494 and switches 520 which are maintained closed by a proper supply of wrapping material in the machine 46. Starting switch contacts 492–3 are connected in parallel with the switches 520. On the other side of relay CR1 are the motor relay contacts 516–5 with run-jog selector contacts 504–2 being connected in parallel thereto.

Referring again to clutch coil 390, it will be seen that an adjustable potentiometer 522 (2B) permits regulation of the voltage supplied to said clutch coil.

Upon energization of relay CR1, contacts CR1–2 close to by-pass switch 492 permitting its plunger to be released and returned to its original position. Contacts CR1–1 are, at this time open preventing reenergization of brake coil 414.

With the wrapping machine set in operation, as above described, the circuits seen in FIG. 21 may be employed to actuate the cookie machine 30 and synchronize its operation with that of the wrapping machine. Line 3 comprises closed starting switch contacts 496–1, normally closed relay contacts CR2–1 and brake coil 454 which is thus energized when said cookie machine is not in operation.

Line 3A comprises starting switch contacts 496–2, stop switch 498, run-jog selector switch 508, missing cookie switch 209, relay contacts CR1–3, rectifier 524, relay contacts DR2–1, PR2–1, variable resistor 526, the coil of relay PR2 and main relay contacts 516–6. A capacitor 528 is connected in parallel with the coil of relay PR2 while run-jog contacts 504–3 are connected in parallel with contacts 516–6. The coil of a relay CR21 (line 3C) is shunted around all components to the right of contacts CR1–3 in line 3B. The coil of a further relay CR2 (line 3D) is connected to line 3B between switch 209 and contacts CR1–3 and between relay PR2 and contacts 516–6. Line 3E comprises contacts CR2–2, DR2–3 and clutch coil 428. Contacts DR2–3 are shunted by variable resistor 530 (line 3F) and relay contacts PR2–2. Relay contacts CR21–1 (line 3G) are connected in parallel with contacts PR2–2. Line 3H includes the synchronizing switch 468 and the coil of relay DR2.

With the wrapping machine set in operation as described above, the cookie machine 30 may be actuated as follows. The plunger of starting switch 496 is depressed opening line 3 (deenergizing brake coil 454) and closing contacts 496–2. Thereupon relays CR2 and CR21 will be energized, contacts CR1–1 (line 3) will open and CR2–2 (line 3E) will close permitting release of the plunger of switch 496. Contacts CR21–1 (line 3G) will open preventing energization of clutch coil 428 except by way of current pulsing means now to be described. With contacts 496–2 (line 3A) or CR2–2 (line 3E) closed, relay PR2 (line 3A) will be energized, and almost instantaneously contacts PR2–1 will open; however, relay PR2 will remain energized for a finite period as a charge is built up on the condenser 528. After the condenser is fully charged relay PR2 is deenergized, contacts PR2 are again closed and capacitor 528 is discharged through rectifier 524. Thereafter in cyclic function the relay PR2 is reenergized and the capacitor 528 charged to provide spaced periods in which the contacts PR2–2 (line 3F) are closed. In this manner pulses of reduced (note resistance 530) current are imposed on the clutch coil 428. Thus sprocket 128 (FIG. 6) will be slippingly coupled to sprocket 116 and the cam carrying wheel 464 rotated in the same direction as the switch 468. When the speeds of the sprockets 116 and 128 are in the same order of magnitude the switch 468 will be closed for a sufficient period of time to energize relay DR2 (line 3H). Contacts DR2–3 (line 3E) will close and immediately full line current or voltage will be imposed on the clutch coil 428 and the sprockets 128 and 116 coupled together in a predetermined relation which gives synchronous operation of the wrapping machine 46 and cookie machine 30.

Upon energization of relay DR2, contacts DR2–1 (line 3A) are opened to render the pulsing circuit inoperative. At the same time contacts DR2–2 close, permitting completion of a circuit through line 4 which includes timer points 531, the divert switch 516, the contacts DR2–2 and the coil of a relay DR21. Said relay will not, however, be energized except when the contacts 531 are momentarily closed to indicate a desired relationship point in the cycle of operation of the cookie machine 30. In passing it will be noted that hold-in contacts DR21–1 by-pass the timer points 531 once the relay DR21 has been energized.

The mechanical arrangement of the timer points is best appreciated from FIGS. 5, 17 and 18. The points 531 are mounted within a housing 533 (FIG. 5) and controlled by rotation of the shaft 136 so that their control bears a fixed relation to the cycle of operation of the cookie machine 30 and also to that of the wrapping machine 46 when synchronization is established. The points 531 are mounted on a plate 535 and are opened by a cam 537 secured to the outer end of shaft 136. Other timer points 539 are mounted on a raised portion of the plate 535 and are controlled by a second cam 541 also secured to the outer end of shaft 136.

This timing feature is of great importance since actuation of relay DR21 causes the ramp 39 to be lowered and cookies fed directly from the machine 30 to the wrapping machine 46. Also such energization stops the feeding action of the pusher 52. By so timing these actions assurance is had that the ramp 39 will not be lowered when a cookie is partially delivered therefrom nor that the pusher will be halted when cookies are only partially discharged from the magazine 56.

From line 5 it will be seen that the diverting solenoid 232 is energized at all times through normally closed contacts DR21-2 and that, with machine 46 running, the magazine feed solenoid 252 is also energized, contacts CR1-4 are then closed. When these solenoids are energized, the ramp 39 is raised to divert cookies to the stacking magazine 48 and other cookies are fed from the auxiliary magazine 56. Thus upon energization of relay DR21 (indicating synchronization of the two machines), contacts DR21-2 open and solenoids 232 and 252 are deenergized permitting direct feed from one machine to the other.

The above describes what might be a normal sequence of operating the machines 30, 46 in coming into synchronized operation. It will be noted that the machine 30 may be independently actuated by depressing the plunger of switch 496 (line 3) to open contacts 496-1 and deenergize brake coil 454. At the same time contacts CR2-2 close to provide a hold-in circuit as the clutch coil 428 is energized through relay contacts CR21-1. The machine 30 is thus set in operation and cookies delivered therefrom are diverted and stored in the magazine 48 since solenoid 232 (line 5) is energized as previously mentioned.

With machine 30 in operation, wrapping machine 46 may be actuated in the manner described above by depressing the plunger of start switch 492 (line 2.) Brake coil 414 is deenergized and clutch coil 390 is energized as in relay CR1. Thereupon contacts CR1-3 (line 3A) close energizing relay CR21 (line 3C) to open contacts CR21-1 (line 3G). Thereafter pulses of current are supplied to the clutch coil 428 by the pulsing relay PR2 in the manner above described. When the synchronizing switch 468 closes for a sufficient length of time, to cause energization of relay DR2, which in turn energizes relay DR21 and deenergizes solenoids 232 and 252 as above described when synchronization is established so that cookies will be fed from the machine 30 directly to the wrapping machine 46.

The cookie making machine 32 is provided with a control circuit, seen in FIG. 22, which is functionally identical with the circuit for machine 30. Consequently no detailed description will be given thereof although some mention will be made later of its functions when all three machines are in operation. In lines 6, 7 and 8 of FIG. 22, the various control components are identified in various ways, where the component has been previously identified the reference character then used is employed. Otherwise, the same reference characters as used in describing machine 30 are employed and primed. Exceptions to this are contacts 516-7 (line 6A), 504-4 (line 6B), CR1-5 (line 6A) and CR1-6 (line 8A) which respectively, in function, correspond to contacts 516-6, 504-3, CR1-3 and CR1-4.

The various selector switches function as follows. When the motor run-jog selector 504 (line 1A) is shifted to its jog position the hold-in circuit for motor start switch 488 is open and the motor will run only as long as the start switch is depressed. The selector 504 is provided with contacts 504-3 (line 3B) and 504-4 (line 6B) which will maintain the clutch coils 428, 428' energized if the selector is shifted to the jog position when the motor start button is depressed and all three machines have been previously actuated. Thereafter all three machines may be jogged or run in synchronized fashion by momentarily depressing the motor start button 488 since the clutches remain energized and coupled to the intermittently operated motor.

The wrapping machine 46 may be jogged by setting the jog selector 506 (line 2A) to the jog position opening the circuit through line 2A and then momentarily depressing starting switch 492. If it is desired to feed cookies from the auxiliary magazines 56, 58 when jogging, the selector switch 514 (line 2A) is shifted to the full feed position energizing the magazine feed solenoids 232, 232' through contacts 514-2 (line 5A), 514-3 (line 8A).

Machine 30 may be jogged by setting the jog selector 508 (line 3A) to the jog position to open the circuit through line 3A and then momentarily depressing starting switch 496.

Provision is also made for automatically stopping the wrapping machine should the supply of wrapping material run out or break. The switches 520 (line 2A) (see also FIG. 1) will automatically open to deenergize relay CR1 and stop the wrapping machine. It will be noted that start switch 492 is provided with contacts 492-3 which bypass switches 520. When the plunger of switch 492 is momentarily depressed these contacts assure starting of the machine until the webs of material are brought to speed and close the switches 520.

Failure of the machine 30 to advance a cookie in proper sequence will be reflected by opening of switch 209 (line 3A) which will cause the machine 30 to stop immediately. If the machine 46 is running its operation will continue uninterrupted since the feed solenoid 252 (line 5A) will be energized through contacts CR1-4 (line 5A) and DR21-2 (line 5) permitting cookies to be fed from the auxiliary magazine 56.

The divert button 516 (line 4) may be depressed at any time the machines 30 and 46 are in synchronized operation to cause cookies to be fed to the stacking magazine 48. This is generally done to divert a few sample cookies for inspection purposes. Opening of the switch 516 will not necessarily cause the relay DR21 to be deenergized immediately, since the timer points 537 are connected in parallel therewith. The points 537 open in timed relation to the operation of machines 30 and 46 and thus when relay 5DR21 does open contacts DR21-2 (line 5) close and the solenoids 232 and 252 are energized to lift the ramp 39 and actuate the auxiliary cookie feeding means in proper timed relationship. Upon release of the direct switch the relay DR21 will be reenergized in proper timed relationship as controlled by the timer points 531 as previously explained.

In all of the above there will be found the broad ends of synchronizing the operation of the wrapping machine 46 with either or both of the cookie machines 30, 32 and also maintaining continuous operation of the wrapping machine 46.

Having thus described our invention what we claim as novel and desire to secure by Letters Patent of the United States is:

1. First and second work treating machines arranged in series for sequential treatment of articles, means for initiating operation of said first machine, separate means for independently initiating operation of said second machine and means operative when both machines are actuated for synchronizing the cycles of operation of said machines regardless of which is first actuated.

2. First and second work treating machines arranged in series for sequential treatment of articles, a single source of power for driving both machines, means for initiating operation of said first machine, separate means for independently initiating operation of said second machine and means operative when both machines are actuated for synchronizing the cycles of operation of said machines regardless of which is first actuated.

3. First and second work treating machines arranged in series for sequential treatment of articles, means for initiating operation of said first machine, separate means for independently initiating operation of said second machine, means operative when both machines are actuated for synchronizing the cycles of operation of said machines regardless of which is first actuated, means for feeding workpieces from the first machine to the second machine when said machines are synchronized, means for diverting articles discharged from said first machine away from the second machine when said machines are not synchronized, an auxiliary supply of articles and means for automatically feeding articles from said auxiliary supply to said second machine when said first machine is not synchronized with the operation of said second machine.

4. A work treating machine, means for feeding articles to said work treating machine, means for initiating operation of the work treating machine, separate means for initiating operation of said feeding means, and means operative when both the work treating machine and the feeding means are actuated for synchronizing the cycles of operation of the feeding means and the machine regardless of which is first actuated.

5. A work treating machine, means for feeding articles to said machine, a single source of power for driving both the machine and the feeding means, means for initiating operation of said work treating machine, separate means for independently initiating operation of said feeding means, means operative when both the work treating machine and the feeding means are actuated for synchronizing the cycles of operation of said feeding means and said machine, said feeding means being arranged to feed articles to said machine only when so synchronized, means for diverting articles from the feeding means away from the said machine when it is not synchronized with the operation of the feeding means, an auxiliary supply of articles, and means for automatically feeding articles from said auxiliary supply to said machine when feeding means is not synchronized with the operation of said machine.

6. First and second work treating machines arranged in series for sequential treatment of articles and including means for feeding individual articles from the first to the second machine, means for supplying individual articles to said second machine when said first machine fails to properly treat and feed articles and means operative in response to such failure for automatically actuating said supplying means in such timed relationship to the cycle of operation of said second machine that articles are continuously treated by the second machine.

7. A first work treating machine, a second work treating machine laterally spaced from said first machine, a third work treating machine longitudinally spaced from said first two machines, means for feeding articles from said first machine along a path towards said third machine, means for feeding articles from said second machine along a path towards said third machine, separate means for independently initiating operation of each of said machines, means for synchronizing the cycles of operation of said first and third machines regardless of which is first actuated, and means for synchronizing the cycles of operation of said second and third machines regardless of which is first actuated.

8. A first work treating machine, a second work treating machine laterally spaced from said first machine, a third work treating machine longitudinally spaced from said first two machines, means for feeding articles from said first machine along a path towards said third machine, means for feeding articles from said second machine along a path towards said third machine, separate means for independently initiating operation of each of said machines, means for synchronizing the cycles of operation of said first and third machines regardless of which is first actuated, and means for synchronizing the cycles of operation of said second and third machines regardless of which is first actuated, separate auxiliary feeding means associated with each first and second machines, means for diverting articles from the path between said first and third machines when their cycles are not synchronized, means for diverting articles from the path between said second and third machines when their operations are not synchronized, and means operative when said third machine is in operation for initiating operation of either or both of the auxiliary feeding means when the respective machines with which they are associated are not in synchronization with the third machine.

9. A work treating machine, a first means for feeding articles to said machine, a second means for feeding articles to said machine and laterally spaced from said first feeding means, separate means for initiating the operation of the machine and each of the feeding means, means for synchronizing the cycles of operation of said machine and said first feeding means, and means for synchronizing the cycles of operation of said machine and said second feeding means.

10. A work treating machine, a first means for feeding articles to said machine, a second means for feeding articles to said machine and laterally spaced from said first feeding means, separate means for initiating the operation of the machine and each of the feeding means, means for synchronizing the cycles of operation of said machine and said first feeding means and means for synchronizing the cycles of operation of said machine and said second feeding means, separate auxiliary feeding means associated with each first and second feeding means, means for diverting articles from said first feeding means away from said machine when the said machine is not synchronized with the first feeding means, means for diverting articles from said second feeding means away from said machine when the said machine is not synchronized with the second feeding means and means operative when said machine is in operation for initiating operation of either or both of the auixiliary feeding means when the respective first and second feeding means with which they are associated are not in synchronization with said work treating machine.

11. In association with a wrapping machine; first and second work treating machines laterally spaced from each other and each having means for discharging a plurality of articles in stacked relation, means for advancing each stack of articles so discharged, said advancing means converging towards closely adjacent paths of travel, a platform spaced beneath the paths of travel of said stacks to receive same in side-by-side relation after they have been advanced a given distance by the advancing means.

12. In association with a wrapping machine having conveyor infeed means; first means for delivering articles to said infeed means, second means for delivering articles to said infeed means in side-by-side relation to said first-mentioned articles, an auxiliary supply adjacent each delivery means, means for delivering articles to the infeed means from either or both supplies, said means being operative upon failure of the respective delivery means with which the auxiliary supplies are associated.

13. First and second work treating machines arranged in series for sequential treatment of articles, a single source of power for driving both machines, means for initiating operation of said first machine, separate means for independently initiating operation of said second machine, means operative when both machines are actuated for synchronizing the cycles of operation of said machines regardless of which is first actuated, means for feeding workpieces from the first machine to the second machine when said machines are synchronized, means for diverting articles discharged from said first machine away from the second machine when said machines are not synchronized, an auxiliary supply of articles and means for automatically feeding articles from said auxiliary supply to said second machine when said first machine is not synchronized with the operation of said second machine.

14. First and second machines as in claim 13 wherein selective means are provided for jogging either machine separately or both machines together in synchronized relation.

15. First and second machines as in claim 13 wherein means are provided for actuating the feeding means for said auxiliary supply at a predetermined point in the cycle of operation of the second machine.

16. First and second machines as in claim 13 wherein means are provided for stacking diverted articles in sequential fashion.

17. First and second machines as in claim 13 wherein selective means are provided for actuating the diverting means when the two machines are operating in synchronized fashion as to inspect articles fed from the first machine.

18. First and second machines as in claim 17 wherein means are provided for actuating the auxiliary feeding means whenever said selective means is actuated thus providing for uninterrupted operation of the second machine.

19. A wrapping machine having an infeed conveyor comprising a platform and spaced flights for advancing articles along said platform, a drive shaft from which said conveyor and wrapping machine are driven, a continuously driven motor shaft, a magnetic clutch for coupling said drive shaft to the motor shaft, means for energizing said magnetic clutch to initiate operation of the wrapping machine and its infeed conveyor, and a work treating machine having means for feeding articles discharged therefrom to the infeed conveyor, driving means for said work treating machine and its feeding means, said driving means comprising a member driven from said motor shaft, a treating machine driving member arranged coaxially of said driven member, a second magnetic clutch for coupling said driven and said driving members, means for energizing said second magnetic clutch to independently initiate operation of said treating machine and its feeding means, a synchronizing member disposed coaxially of said driven and driving members and rotated from the wrapping machine drive shaft at the same rate as said driven member, a cam member rotatable with said driving member, a switch rotatable with said synchronizing member and adapted to be closed by said cam member, synchronizing means operative immediately upon one of the magnetic clutches being actuated when the other clutch is also actuated, said synchronizing means including means for temporarily reducing the energization of said second magnetic clutch so that slippage occurs between the driving and driven members, means operative in response to closure of the synchronizing switch by said cam member for fully energizing said second clutch and maintaining said second clutch fully energized so long as the switch is closed by the cam member thus coupling said driving member to said driven member in predetermined relation with the wrapping machine and synchronizing the cycles of the two machines.

20. A wrapping machine and a work treating machine as in claim 19 wherein the means for temporarily reducing the energization of said second clutch comprise means for applying a pulsating current to the coil of said second clutch.

21. A wrapping machine and a work treating machine as in claim 20 wherein the pulsating current means includes a relay having a set of normally open contacts in series with the clutch coil, and a second set of normally closed contacts in series with the relay coil and a condenser in parallel with the relay coil and wherein is further provided means for completing the circuit to the relay coil when both machines are actuated whereby the relay will be maintained energized by said condensor for a finite period of time and a pulse of current applied to the clutch coil and further including a second relay also having a pair of normally open contacts in series with said clutch coil, the coil of said second relay being in series with said synchronizing switch whereby when said switch is closed continuous current will be applied to the clutch coil.

22. In a combination comprising two machines operating in succession on an article, means for driving one of said machines at full operating speed, means for driving the other of said machines at full operating speed, said last-named means including a slippable clutch, the powered member of which is driven at the full operating speed of said other machine when said one machine is in operation, means for actuating the driving means of said machines, automatic means effecting slipping engagement between said clutch members when both machines are actuated but are not in synchronism, whereby the driven member of said slippable clutch rotates at less than full speed, and means for automatically effecting positive engagement between the rotating clutch members when said members reach a position relative to each other in which the two machines are operating in synchronism.

23. In a combination comprising two machines as set forth in claim 22 wherein the means for effecting positive engagement of the two clutch members includes a member disposed coaxially of said clutch members, a member rotatable with the driven clutch member, a cam member secured to one of the last two mentioned members, a switch disposed for coaction therewith attached to the other of said two members and means responsive to actuation of said switch for effecting said positive engagement.

24. In a combination comprising two machines operating in succession on an article, means for driving one of said machines at full operating speed, means for driving the other of said machines at full operating speed, said last-named means including a slippable clutch, the powered member of which is driven at the full operating speed of said other machine when said one machine is in operation, means to actuate the driving means of said one machine, means to effect slipping engagement of the clutch members to actuate the drive of said other machine at less than full speed, and means for automatically effecting positive engagement of the clutch members when the rotating clutch members reach a position relative to each other in which the two machines are operating in synchronism.

25. A control system for two machines operated in series, said system comprising a single motor driving two constantly rotating driven members, a driving member for one of said machines mounted adjacent to and coaxially of one of said driven members, a second driving member for the other of said machines mounted adjacent to and coaxially of the other driven members, a magnetic clutch disposed between each adjacent pair of driving and driven members, means for independently energizing said clutches to couple either or both of the driving members to the respective adjacent rotating driven members and means for synchronizing the two driving members regardless of which is first coupled to a driven member.

26. A control system as in claim 25 wherein the synchronizing means comprise, a shaft rotated by one of the driving members and disposed coaxially of the other driving member and associated driven member, a switch keyed to said shaft, a cam rotatable with the other driving member, means operative when both clutches are actuated for partially energizing the magnetic clutch associated with said other driving member to rotate said other driving member in the same direction as said switch until said switch is maintained closed by said cam whereupon the last-mentioned clutch will be fully energized thus synchronizing said two machines.

27. A wrapping machine having an infeed conveyor comprising a platform and spaced flights for advancing articles along said platform, a drive shaft from which said conveyor and wrapping machine are driven, a continuously driven motor shaft, a magnetic clutch for coupling said drive shaft to the motor shaft, means for energizing said magnetic clutch to initiate operation of the wrapping machine and its infeed conveyor, and a work treating machine having means for feeding articles discharged therefrom to the infeed conveyor, driving means for said treating machine and its feeding means, said last-named driving means comprising a member driven from said motor shaft, a treating machine driving member arranged coaxially of said driven member, a second magnetic clutch for coupling said driven and said driving members, and means for energizing said second magnetic clutch to independently initiate operation of said treating machine and its feeding means, synchronizing means comprising a synchronizing member disposed coaxially of said driven and driving members and rotated from the wrapping machine driven shaft at the same rate as said driven member, a cam member rotatable with said driving member, a switch rotatable with said synchronizing member and adapted to be closed by said cam member, control means operative immediately upon one of the magnetic clutches being actuated when the other clutch is also actuated, said control means including means for temporarily reducing the energization of said second magnetic clutch so that slippage occurs between the driven and driving members, means operative in response to closure of the synchronizing switch by said cam member for fully energizing said second clutch and maintaining said second clutch fully energized so long as the switch is closed by the cam member thus coupling said driving member to said driven member in a predetermined relation with the wrapping machine and synchronizing the cycles of the two machines, said treating machine feeding means including spaced pushers and a ramp movable between upper and lower positions, said ramp in its lower position being spaced above said conveyor platform to permit cookies to drop thereon in advance of the conveyor flights as the articles are advanced thereto by said pushers, a diverting channel aligned with the ramp in its upper position and leading laterally from said machines, automatic means for raising said ramp to its upper position when the treating machine is not synchronized with the wrapping machine whereby cookies will be diverted and advanced by said pushers along said ramp, an auxiliary article magazine disposed laterally of and adjacent the infeed conveyor platform with its lower portion vertically disposed, a stop spaced beneath the lower end of the magazine, a pusher movable to discharge articles from the magazine onto the conveyor platform, and means operable in response to a failure of articles to be fed to the infeed conveyor from the treating machine for so moving the pusher.

28. A wrapping machine and a work treating machine as in claim 27 wherein both of the magnetic clutches remain energized upon release of the actuating means and further selective means are provided for deenergizing each of said clutches and additional selective means are provided for maintaining said clutches energized only so long as the energizing means are operated thus enabling jogging of said machines.

29. A wrapping machine and work treating machine as in claim 28 wherein further selective means are provided for jogging said machine with their cycles of operation synchronized.

30. A wrapping machine and work treating machine as in claim 27 wherein the treating machine has its discharge spaced above a platform also included in its feeding means and wherein the treating machine is arranged to operate at a predetermined rate such that one article is discharged onto the feed platform and then a second article is fed thereupon in advance of each feeding means pusher whereby the articles will be fed to the wrapping machine in stacked relation.

31. A wrapping machine and a work treating machine as in claim 30 wherein the magazine is spaced above the stop a distance equal to the height of two articles whereby the pusher will supply a stack of articles to the infeed conveyor when the pusher is actuated.

32. A wrapping machine and a work treating machine as in claim 27 wherein is provided a stacking magazine aligned with and spaced beneath the diverting channel, a stacking wheel having article receiving pockets is rotatably mounted between said channel and said stacking magazine and means are provided for rotating said stacking wheel in timed relation to the movement of the pushers whereby articles will be received in the stacking wheel pockets and stacked on their edges in the stacking magazine.

33. A wrapping machine and a work treating machine as in claim 27 wherein a switch is mounted adjacent the wrapping material web feed and adapted to be closed when the web is fed in a normal manner, said switch being arranged electrically in series with the means for energizing the magnetic clutch for initiating operation of the wrapping machine whereby a failure in said web will result in halting the operation of the wrapping machine and wherein further means cause said ramp to raise and divert articles away from the work treating machine.

34. A wrapping machine and a work treating machine as in claim 27 wherein selective means are provided for raising said ramp to divert articles when the two machines are operating in synchronism, said means also actuating movement of auxiliary magazine pusher whereby operation of the wrapping machine may continue in uninterrupted fashion.

35. A wrapping machine and a work treating machine as in claim 34 wherein means are provided for timing the activation and deactivation of said selective means in fixed relation to the cycles of said machines.

36. A wrapping machine and work treating machine as in claim 27 wherein the means for moving the auxiliary magazine pusher comprise follower means operatively connected thereto, cam means for driving the follower means, means for constantly driving the cam means in fixed timed relation to said infeed conveyor, means for holding said follower means away from said conveyor and wherein the means operable in response to article feed failure release the holding means to initiate movement of the said pusher.

37. A wrapping machine and a work treating machine as in claim 36 wherein the holding means are arranged to retain the follower means in such a position that upon their release the pusher will immediately begin to feed an article.

References Cited in the file of this patent
UNITED STATES PATENTS

| | | |
|---|---|---|
| 517,831 | Arnold | Apr. 10, 1894 |
| 2,051,573 | Quick et al. | Aug. 18, 1936 |
| 2,255,777 | Jones | Sept. 16, 1941 |
| 2,325,163 | Goodwin et al. | July 27, 1943 |
| 2,425,167 | Whitehead | Aug. 5, 1947 |
| 2,440,749 | Klock | May 4, 1948 |
| 2,479,060 | Davidson | Aug. 16, 1949 |
| 2,656,656 | Murdoch et al. | Oct. 27, 1953 |